US00RE36873E

United States Patent [19]

Gouldson et al.

[11] E Patent Number: Re. 36,873

[45] **Reissued Date of Patent: *Sep. 19, 2000**

[54] GARMENT HANGER

[75] Inventors: Stanley F. Gouldson, Northport; Roland G. Harmer, Centereach, both of N.Y.

[73] Assignee: Spotless Plastics Pty. Ltd., Australia

[ * ] Notice: This patent is subject to a terminal disclaimer.

[21] Appl. No.: 09/064,305

[22] Filed: Apr. 22, 1998

Related U.S. Patent Documents

Reissue of:

[64] Patent No.: 5,509,587
Issued: Apr. 23, 1996
Appl. No.: 08/200,822
Filed: Feb. 23, 1994

U.S. Applications:

[63] Continuation of application No. 07/919,282, Jul. 24, 1992, abandoned, which is a continuation-in-part of application No. 07/870,697, Apr. 16, 1992, Pat. No. Des. 348,987, and a continuation-in-part of application No. 07/870,696, Apr. 16, 1992, Pat. No. Des. 350,236.

[51] Int. Cl.[7] ..... A47G 25/14

[52] U.S. Cl. ..... 223/91; 223/85; 223/88

[58] Field of Search ..... 223/91, 96, 85, 223/88; 40/322; D6/315

[56] References Cited

U.S. PATENT DOCUMENTS

| | | |
|---|---|---|
| D. 236,572 | 9/1975 | Ostroll . |
| D. 246,817 | 1/1978 | Mainetti . |
| D. 283,854 | 5/1986 | Marshall . |
| D. 298,184 | 10/1988 | Tendrup et al. . |
| D. 305,834 | 2/1990 | DeVito . |
| D. 305,835 | 2/1990 | DeVito . |
| D. 324,459 | 3/1992 | Gouldson et al. . |
| D. 327,578 | 7/1992 | Fildan . |
| D. 327,581 | 7/1992 | Fildan . |
| D. 329,754 | 9/1992 | Gouldson et al. . |
| D. 329,755 | 9/1992 | Gouldson . |
| D. 335,581 | 5/1993 | Gouldson . |
| D. 340,138 | 10/1993 | Gouldson . |
| D. 340,586 | 10/1993 | Fildan . |
| D. 350,236 | 9/1994 | Gouldson et al. . |
| 3,463,369 | 8/1969 | Moskowitz ..... 223/96 |
| 3,738,549 | 6/1973 | Driscoll . |
| 3,949,914 | 4/1976 | Ostroll . |
| 4,006,547 | 2/1977 | Samuels et al. . |
| 4,115,940 | 9/1978 | Phillips . |
| 4,623,079 | 11/1986 | Tendrup et al. . |
| 4,629,102 | 12/1986 | Tendrup et al. . |
| 4,828,155 | 5/1989 | Louw . |
| 4,865,236 | 9/1989 | Dongas . |
| 4,886,195 | 12/1989 | Blanchard . |
| 4,892,237 | 1/1990 | Duester et al. . |
| 4,951,855 | 8/1990 | Jacobson et al. . |
| 5,040,686 | 8/1991 | Morrow . |
| 5,062,556 | 11/1991 | Willputz . |
| 5,065,916 | 11/1991 | Fildan . |
| 5,071,045 | 12/1991 | Hollis . |
| 5,074,447 | 12/1991 | Kolton et al. . |
| 5,092,502 | 3/1992 | Kolton et al. . |
| 5,127,559 | 7/1992 | Freer et al. . |
| 5,129,557 | 7/1992 | Kolton et al. . |

FOREIGN PATENT DOCUMENTS

| | | |
|---|---|---|
| 20035/83 | 10/1983 | Australia . |
| 544211 | 11/1983 | Australia . |
| 9009651 | 8/1990 | WIPO . |

*Primary Examiner*—Bibhu Mohanty
*Attorney, Agent, or Firm*—Scully, Scott, Murphy & Presser

[57] ABSTRACT

A system for displaying garments incorporating a lightweight, one-piece, molded, plastic garment hanger having a hook member, body member, and upswept arms, wherein a garment retaining clip is longitudinally positioned on either side of the hook member at a height such that an axis drawn therebetween would intersect a circle defined around a center of curvature drawn by a radius defined at the upper portion of the curve of the hook member, to provide a high rack to display ratio for garments suspended therefrom.

16 Claims, 7 Drawing Sheets

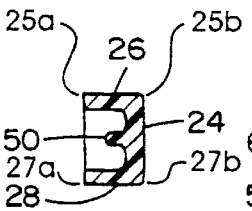
FIG. 8 (AMENDED)
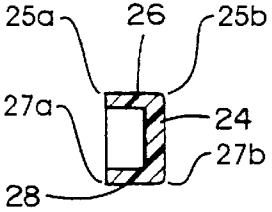
FIG. 6 (AMENDED)

GARMENT HANGER

Matter enclosed in heavy brackets [ ] appears in the original patent but forms no part of this reissue specification; matter printed in italics indicates the additions made by reissue.

This application is a continuation of our application U.S. Ser. No. 07/919,282 filed Jul. 24, 1992 which is a continuation-in-part of our design application U.S. Ser. No. 870,697, now U.S. Pat. No. Des. 348,987 filed Apr. 16, 1992, entitled Garment Hanger and our design application U.S. Ser. No. 870,696, now U.S. Pat. No. Des. 350,236 , entitled Garment Hanger with Vertical Clip.

FIELD OF THE INVENTION

The present invention is directed to the field of lightweight, molded, plastic garment hangers.

BACKGROUND OF THE INVENTION

Molded plastic garment hangers are widely used for the purpose of shipping and displaying garments. Particularly, in the garment manufacturing industry, such a hanger is often an inexpensive ship-on type whereby the garment is shipped from the manufacturer or wholesaler to the retailer while suspended from the hanger. Generally, such garment hangers are inexpensive single-piece or unitary molded plastic structures which are adapted to be either discarded at the time of sale, returned to the garment manufacturer or provided to a customer free of charge in conjunction with the purchase of the garment suspended therefrom.

Garment hangers of that type may either be simply constructed as molded plastic structures incorporating a unitary or metal central hook portion adapted to be suspended from a suitable support, such as a garment rack or the like, or with a hanger body portion having arms extending in opposite directions from the base of the hook portion so as to facilitate a garment to be suspended therefrom. When needed for specific use, the opposite or distal ends of the body portion or arms may be members to enable the attachment of various kinds of garments thereto, such as underwear, slips, brassieres, swimwear, multiple garments, and the like.

Typically, such garment hangers have a hook portion elevated above a horizontally-extending body portion, as shown in U.S. Pat. Nos. 4,828,155; 3,463,369; and U.S. Pat. Des. No. 246,817. In order to grasp a garment effectively, clips, grips, slots or hooks (collectively referred to herein as "clips") are placed at the ends of the body portion of the hanger. Such prior art hangers are exemplified by U.S. Pat. Nos. 4,623,079; 4,629,102; 3,738,549; and U.S. Pat. Des. No. 236,572.

U.S. Pat. Nos. 4,623,079 and 4,624,102 disclose a hanger having an elevated hook member, a hanger body having horizontally extending arms and, respectively, resilient grips and clips of a U-shaped configuration located at the end of each arm. The U-shaped configuration includes first and second members, which are connected to each other; the second member also being connected to the hanger body. The U-shaped garment engaging grip or clip has a double-flex mechanism to prevent breakage of the grip or clip when a garment is resiliently engaged.

The hanger disclosed in U.S. Pat. No. 3,738,549 is specifically adapted for displaying brassieres. The brassiere hanger includes a centrally disposed hook and upwardly and outwardly extending first and second hanger arms wherein at the end of each arm a strap-receiving means is located. The strap-receiving means defines first and second strap receiving slots which are generally U-shaped channels into which the shoulder strap of the brassiere is inserted thereby allowing the brassiere shoulder strap to rest on or be draped over the first strap-receiving element.

U.S. Pat. Des. No. 236,572 discloses a similar hanger which includes a centrally-located hook at the base of which is a solid hanger body portion, the lower portion of which defines a wide-V shape and upwardly and outwardly and then vertically extending first and second hanger arms.

When displaying the garments hung on such garment hangers in a retail store a unit having extension rods is typically used. The extension rods extend outward from a vertically extending base at different elevations. Each extension rod holds a finite number of hangers. The separation distance between the different levels must be at least the same size as the hanging distance of the hanger with the garment hung therefrom. By maintaining such a separation distance, placing and removing the hangers on the extension rods is done without interference form an extension rod that is immediately beneath.

In each of the above-described prior art hangers the arms of such hangers are narrow. Consequently, when a brassiere is hung therefrom the shoulder straps must be wrapped around the hanger arms to take up slack. Hangers having wider arms and body members, such as the hangers disclosed in U.S. Pat. Nos. 5,074,447 and 5,040,686, have been developed to overcome this problem, as well as to maintain a neat appearance and to increase the number of units of the hanger with the brassiere which can be hung by a display unit.

The hanger of U.S. Pat. No. 5,040,686 includes a central portion and two elongated hanger arms which extend away from the hanger portion. To maintain a neat appearance and to limit the number of times the straps of a brassiere must be wrapped around the hanger arms to avoid slack, the hanger arms are wider than in other prior art hangers. Instead of a hook portion, the central portion has an inner facing side defining a space adapted to accommodate a support member inserted therein, such as an extension rod, so that a portion of the side may rest against the support member. The portion of the side resting against the support member is at an elevation higher than where the shoulder straps of the brassiere are to be held by holding means located on the hanger arms.

U.S. Pat. No. 5,074,447 discloses a display hanger having a hanger body which includes a central portion having an extension thereabove and sideward portions ending in brahanging extremities and effecting high density display of garments. The extension above the central portion includes a hook portion having an interior detent for receipt of a display rod. The sideward portions are transversely-extending cantilever-supported members.

The prior art also includes a number of garment hangers that are molded so as to receive various indicia or logos, which may be representative of the garment manufacturer, designer or, possible, the retail establishment, to provide a form of advertisement and to also identify the origin of the garment being suspended therefrom. An embossed logo may also be imprinted therein so as to provide various color contrasts provided through molded raised or recessed surfaces representative of a logo, advertisement, or the like as mentioned hereinbefore. Typical examples of hangers having an indicia or logo include U.S. Pat. Nos. 4,886,195; 4,006,547; 4,115,940; and PCT/AU90/00048.

Most molded plastic garment hangers are strengthened by arms which are of an I-shaped cross-section ("I-section")

having a central web and upper and lower flanges defining the upper and lower surfaces of the hanger arms. A hanger with an I-section is more specifically described in Australian Patent No. 54 4211 (AU-B-21403/83) and U.S. Pat. Des. No. 283,854. The I-section of the arms is substantially symmetrical about the horizontal neutral axis of said section. The channel or I-section extends through the transition region between the arms and shoulder of the hanger. A typical example of such a hanger having an I-section is that set forth in U.S. Pat. Nos. 4,623,079 and 4,629,102.

Garment hangers having an I-section are widely used as intimate apparel hangers because such hangers are simple to manufacture molds for and easy to mold. However, hangers having an I-section tend to fracture, under extreme load conditions, in the region of transition between the shoulder of the hanger and the arm of the hanger, particularly when the hanger is used to support a heavy garment. When the hanger is used to support a heavier garment, the arms tend to bend at the transition region between the shoulder and arms and can, therefore, develop fractures or breakages in these regions. Such problems can develop, in particular, when the hanger is molded from a less flexible material such as general purpose polystyrene.

In terms of forces applied to a hanger when a garment is hung, hangers having an I-section are the strongest resisting the weight of the garment. The maximum rigidity is concentrated in the direction of minimum loading. In the intimate apparel industry, however, the hanger's ability to resist the weight of the clothing is not the greatest consideration. With that class of clothing the bending moment due to elastic waistbands and the method of loading the garment is usually as high, if not higher, than the loading due to garment weight. The result being that the hanger is more massive than it needs to be.

To provide acceptable resistance to lateral deflection when a garment is hung on such a hanger, it is necessary to maintain the width of the body and arms of the hanger above a pre-determined minimum which is dependent upon the weight of the garment and the maximum wall section allowable for effective molding. The type of raw material (i.e., plastic) is also relevant. While an I-section is adequate for supporting a vertical load, its resistance to lateral deflection can only be improved by the use of superior grade raw material, by increasing the wall section and by increasing the width of the flanges.

SUMMARY OF THE INVENTION

The present invention is directed to a light-weight, one-piece, molded, plastic hanger that is particularly adapted for high volume injection molding. More particularly, the hanger of the present invention comprises a hook member, a body member and first and second upswept arms; the body member and upswept arms being molded with a U-shaped cross-section ("U-section"), E-shaped cross-section ("E-section") or M-shaped cross-section ("M-section") wherein at the end of each of said upswept arms a garment retaining clip is positioned, longitudinally on either side of said hook member, at a height such that an axis drawn therebetween would intersect a radius of a circle defined around the curve of the upper portion of said hook member.

In a preferred form of the invention, the garment retaining clip positioned at the clip end portion of each upswept arm is composed of two horizontal clips, one positioned above the clip end portion and one positioned below the clip end portion, or at least one horizontal clip and a vertical clip. In the latter embodiment the vertical clip can be positioned so that the center of the vertical clip straddles the plane of said body member.

The U-section of the body member and upswept arms defines a vertical wall and first and second lateral webs extending therefrom. To form the E-section, a center rib is extended outwardly from said vertical wall between said lateral webs. In one particularly, preferred embodiment the first and second lateral webs extend an equal distance forwardly, from the vertical wall; and the first and second lateral webs and the vertical wall are equal in thickness. To ease parting of the hanger from its mold cavity and to reduce the mass of the hanger, without diminishing the strength of the hanger and the ability of the hanger to resist deflection, the first and second lateral webs of the U-section and the E-section may be tapered. The center rib of the E-section may also be tapered.

For further reinforcement a plurality of integral ribs which extend tangentially from the first lateral web to a point on the (opposite) second lateral web may be integrally molded at specific locations on the body member and upswept arms of the hanger of the present invention.

The M-section of the body member and upswept arms defines a first curved web and a second curved web joined in mid-section by a third curved web to form a curved M-section. For further reinforcement a plurality of integral ribs may be integrally molded at various locations on the body member and upswept arms.

In still another embodiment, the hanger of the present invention having a body member and upswept arms may be molded with a stabilizing bar that extends longitudinally from an inner lower edge of the reinforcing web of the vertical clip of each clip end portion, to keep the hanger straight on an extension rod or bar regardless of the weight of the suspended article.

In yet another embodiment, the light-weight molded plastic garment hanger of the present invention has an index cap for identifying at least one characteristic of the garment hanging therefrom. More particularly, the hook member of the present inventive hanger structure has an upstanding flange molded integrally therewith that defines a snap-fit engagement means. The snap-fit engagement means is defined so as to engage an aperture defined by the index cap.

By molding the garment hanger in the above form, a light-weight garment hanger especially resistant to lateral deflection rather than weight-bearing deflection is provided without necessarily increasing mass size, using superior raw materials or increasing the depth of the flanges. Since it is not necessary to increase mass size of the hanger or use superior raw materials to improve the hanger's ability to resist lateral deflection, the cost of the raw materials is lower than that of hangers having similar lateral deflection capabilities. Further, using less plastic material is advantageous to the environment as well as reductive to the costs of transoceanic shipment of the hangers to manufacturers and/or retailers and the costs of shipment of hangers with garments hanging therefrom to retailers. The elevated garment engaging clips also result in space savings and advantageous marketing since a high rack to display ratio is neatly maintained.

Accordingly, it is a basic object of the present invention to provide a molded plastic garment hanger having a greater strength to weight ratio than comparable garment hangers of the same or greater weight.

It is a further object of the present invention to provide an inexpensive, light-weight, molded plastic garment hanger especially resistant to twisting and lateral deflection.

BRIEF DESCRIPTION OF THE DRAWINGS

The foregoing and other objects of the invention may now be more readily ascertained from the following detailed description of preferred embodiments thereof, taken in conjunction with the accompanying drawings; in which:

FIG. 6 illustrates an enlarged sectional view taken along line 6—6 of FIG. 1;

FIG. 8 illustrates an enlarged sectional view taken along line 8—8 of FIG. 3;

DETAILED DESCRIPTION OF THE PREFERRED EMBODIMENTS

FIGS. 1–15 illustrate several garment hangers of the present invention. While the invention will be described and illustrated with respect to several intimate apparel hangers, it is understood that the invention is equally applicable to other types of garment hangers.

Figure 1:
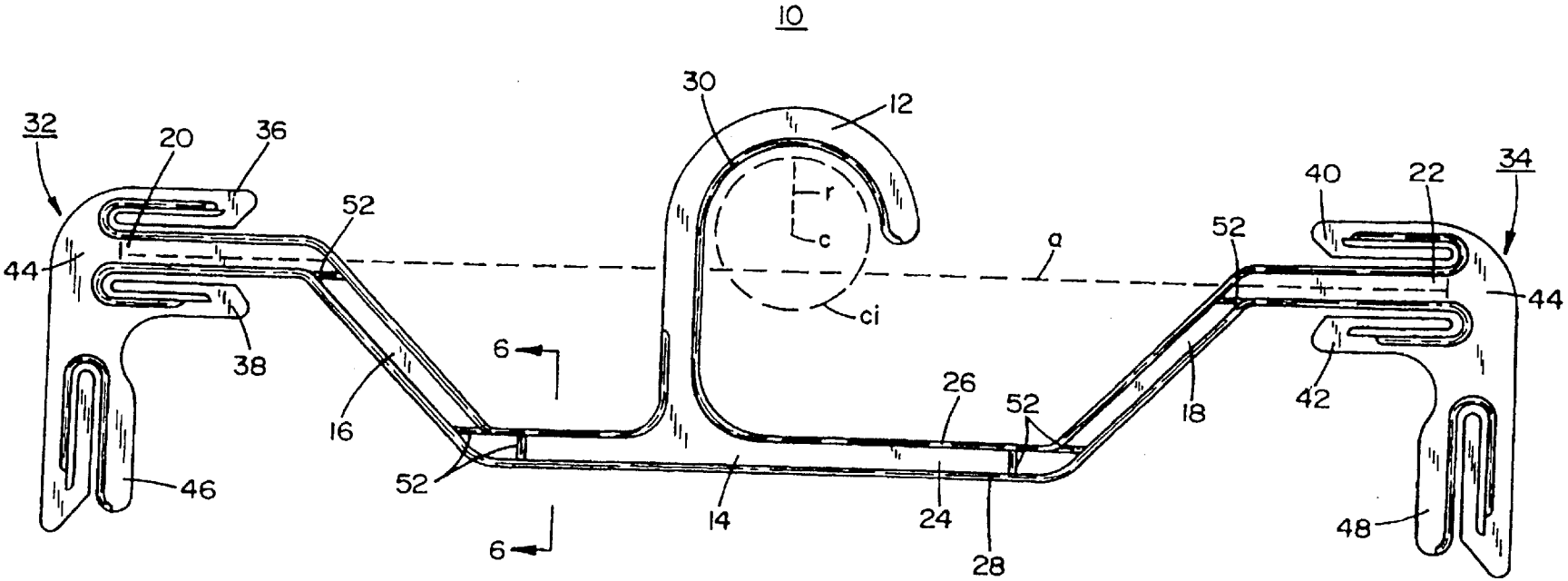
FIG. 1 illustrates a front elevational view of a lightweight, molded, one-piece plastic hanger pursuant to the inventive concept.

Referring now in detail to the drawings, and particularly, the hanger construction in FIG. 1, there is illustrated a front elevational view of a molded plastic garment hanger 10 having a central hook portion 12 which is integrally molded with hanger body 14, the latter of which includes a pair of coplanar oppositely directed upswept arms 16 and 18 each of said upswept arms ending with a clip end portion 20 and 22 for suspending one or more garments, as is well-known in the industry. The clip end portion 20 or 22 is then equipped with a suitable garment gripping or clipping structure.

In this first embodiment, it is preferred that said body member 14 and said upswept arms 16 and 18 are molded with a U-shaped cross-section ("U-section"), said U-section defining a vertical wall 24 and first and second lateral webs 26 and 28 extending therefrom. An enlarged view of the U-section is illustrated in FIG. 6. In order to provide reinforcement for the hook portion 12, first lateral web 26 can be continuously extended up the base of the hook portion 12 along the underside of the hook portion 12 as flange 30.

Figure 2:
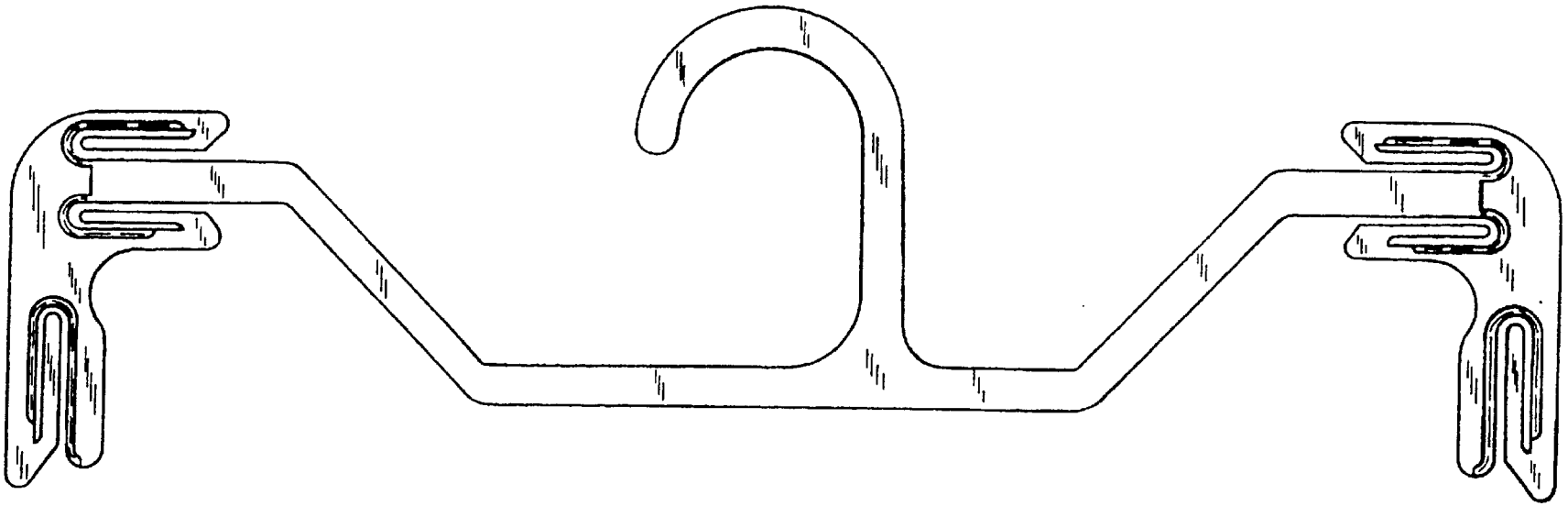
FIG. 2 illustrates a reverse view of FIG. 1.
Figure 3:
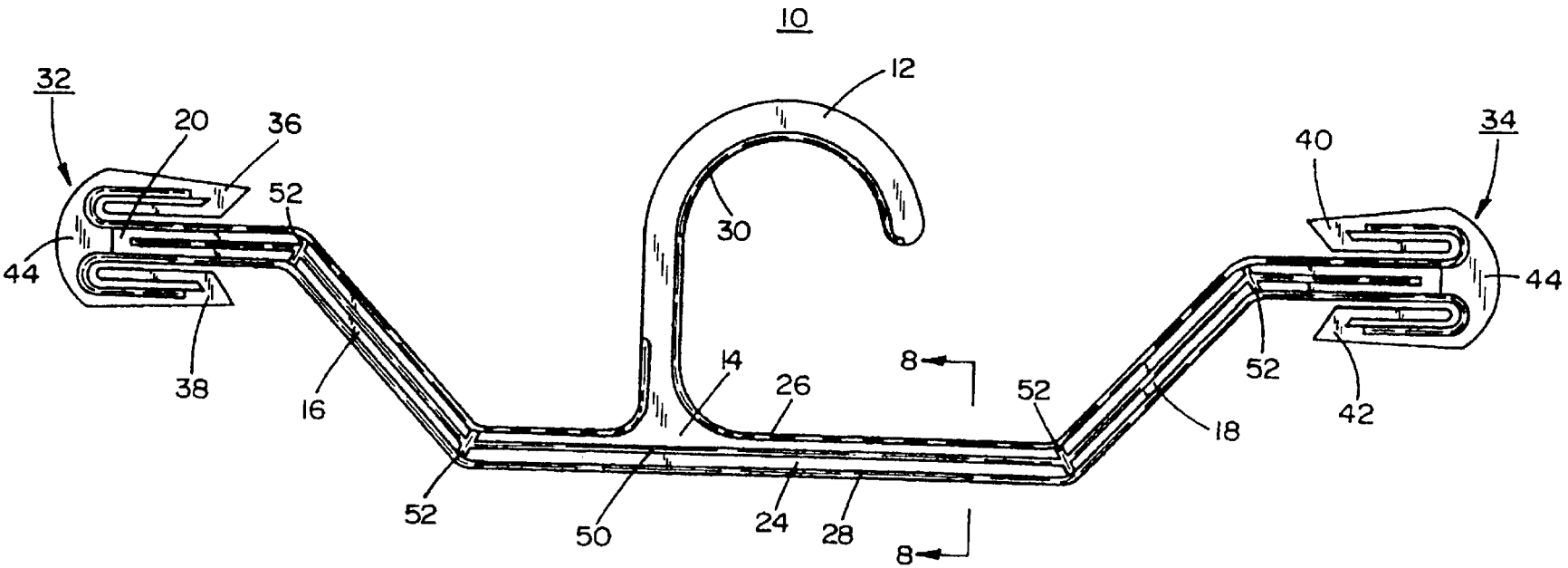
FIG. 3 illustrates an embodiment in a view similar to FIG. 1, showing a modification thereof.

The clip end portion 20 or 22 can be equipped with a suitable garment retaining clip as exemplified in FIG. 1 by clips 32 and 34. Suitable garment gripping or clipping structures include the U-shaped structures disclosed in U.S. Pat. Nos. 4,623,079 and 4,629,102, respectively. As illustrated in FIGS. 1 to 5, 11 and 12, in the present invention the garment retaining clip 32 or 34 is positioned longitudinally on either side of the hook member 12 at a height such that an axis (a) drawn therebetween would intersect a circle (ci) defined around said center of curvature (c) by said radius (r). In FIGS. 1 and 3, two U-shaped clips 36 and 38 are each positioned horizontally above and below the clip end portion 20. U-shaped clips 40 and 42 are similarly positioned above and below clip end portion 22. Each horizontal clip is connected to the clip end portion by a reinforcing web 44 which is a continuation of said lateral webs 26 and 28 and said vertical wall 24. In a preferred embodiment as shown in FIG. 1, additional U-shaped clips 46 and 48 attached to reinforcing web 44 are positioned vertically wherein the center of said vertical clips 46 and 48 straddles the plane of body member 14.

It will be noted from FIG. 1 of the drawings that the U-section, defined by vertical wall 24 and first and second lateral webs 26 and 28, continues along a continuous path from the end 20 of upswept arm 16 to the end 22 of upswept arm 18. FIG. 2 illustrates a reverse view of FIG. 1. The smooth outside portion of the vertical wall can be observed.

As illustrated in FIG. 3, where like numerals refer to like parts of the hanger, in another preferred embodiment, the hanger of the present invention can be further reinforced by molding the body member 14 and upswept arms 16 and 18 with a U-section having a center rib 50 that extends outwardly from vertical wall 24 and lateral webs 26 and 28, thereby creating an E-shaped cross-section ("E-section"). An enlarged view of the E-section is illustrated in FIG. 8. It will be noted from FIG. 3 of the drawings that the E-section, defined by vertical wall 24, first and second lateral webs 26 and 28, and center rib 50; continues along a continuous path from the end 20 of upswept arm 16 to the end 22 of upswept arm 18. A reverse view of FIG. 3 would show a smooth outside portion of the vertical wall 24 similar to FIG. 2 but without vertical clips.

In a preferred embodiment, the cross-sections shown in FIGS. 6 and 8 have a first lateral web 26 no more than 6.5 mm apart from a second lateral web 28; preferably, the first lateral web 26 is about 4 mm apart from said second lateral web 27. It is also preferred that said first and second lateral webs 26 and 28 extend an equal distance forwardly from said vertical wall 24; preferably, no more than 5 mm from said vertical wall 24 and, most preferably, about 2.75 mm *to define a first and a second parallel edge 25a, 25b for lateral web 26 and a first and a second parallel edge 27a, 27b for lateral web 28, as illustrated in FIGS. 6 and 8*. In still another preferred embodiment, said first and second lateral webs 26 and 28 and said vertical wall 24 are equal in thickness. The preferred range of thickness is about 0.75 mm to about 1.25 mm and, most preferably, about 1 mm.

In a preferred embodiment, the center rib 50 of the E-section shown in FIG. 8 extends about 0.75 mm to 2.75 mm, preferably, about 1 mm forwardly from said vertical wall 24.

Typically, hangers need to resist at least two forces acting on the hanger while in service; firstly, the vertical force due to the weight of the garment suspended from the hanger and secondly, the force due to any elasticized waistband stretched across the hanger. An offset leg hanger, such as the hanger of the present invention, has a third force acting on the hanger due to the torque created because the center of gravity of the hanger and garment is not in the same plane as the hanger hook.

To resist a vertical force, the I-section provides the most economical use of material. To resist vertical and horizontal forces, a hollow square section provides the most economical use of material. To resist forces all around, the hollow cylinder provides the most economical use of material. Unfortunately, it is not economically or feasible to produce hangers of a hollow section, square or round. Thus, in an attempt to equalize the forces (loads) encountered by a hanger in garment use, alternative sections, such as the U-, E- and M-sections, that will use less material for the same performance or have better performance with the same amount of material, are preferable to the I-section.

In the intimate apparel industry, the vertical force generated by a garment is not the greatest force loading. The lateral forces as applied by a waistband, particularly an elastic waistband, stretched between two vertical clips and the forces applied to load a garment onto the hanger are generally greater than the vertical forces applied to the hanger due to the weight of a garment suspended therefrom. In the past, a hanger's ability to resist lateral deflection was improved by increasing the mass of the garment hanger, i.e., by increasing the wall section and/or width of the flanges, or by using superior grade raw material. However, due to the insignificant vertical force, greater lateral forces and torque forces in the intimate apparel industry, the I-section does not offer the best weight versus strength compromise.

The maximum deflection of a beam loaded evenly at each end and loaded in the middle is determined by the following equation:

$$Y^{max}=WL^3/48EI$$

wherein $Y^{max}$=Maximum deflection in the beam

I=Modulus of Inertia of the beam

E=Modulus of Elasticity of the beam material (Young's Modulus)

L=Length of the beam

W=Load

The Modulus of Inertia of an I-section (or "I-beam") is:

Beam loaded vertically $I=[bd^3-h^3(b-t)]/12$

Figure 16:
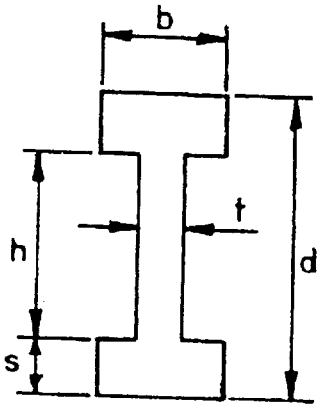
FIG. 16 illustrates an I-beam.

Beam load horizontally $I=[2sb^3+ht^3]/12$ wherein, as illustrated in FIG. 16, b=breadth of the beam d=height of the beam h=inside distance between the outer ribs s=thickness of outer ribs t=thickness of main membrane By resolving these equations it is shown that the I-beam will deflect nearly 10 times further horizontally than vertically for the same applied load.

The Modulus of Inertia of a U-section beam is:

Beam loaded vertically $I=[bd^3-h^3(b-t)]/12$

Figure 17:
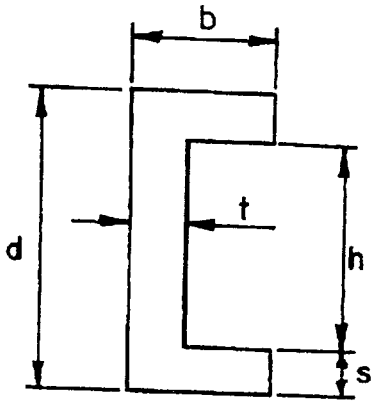
FIG. 17 illustrates a U-section beam.

Beam loaded horizontally $I=[(2sb^3+ht^3)/12]-A(b-y)^2$ wherein, as illustrated in FIG. 17, like symbols refer to like parts in FIG. 16, and A=area of section Y=distance from neutral axis to extreme fiber By resolving these equations it is shown that the deflection to load for the U-section beam 13 the same as for the I-beam. However, the resistance to deflection horizontally of the U-section began is improved by a factor of 2 thereby bringing the horizontal and vertical deflections closer to balance. The unit area is the same in both cases. It is noted that the center rib 50 of a hanger having an E-section (illustrated in FIGS. 3 and 8) provides an even stronger hanger; the strongest hanger being molded with an M-section (illustrated, for example, in FIGS. 4 and 10).

The use of the U-section or the E-section allows the mass of the hanger to be reduced in thickness and weight, thereby reducing the material cost for the hanger and the shipping cost during transit from the various remote facilities in the United States. The strength of a hanger having a body member 14 and upswept arms 16 and 18 of a U-section or E-section is dependent on the depth of the section not the width. Consequently, a hanger having a greater strength to weight ratio is produced.

Figure 9:
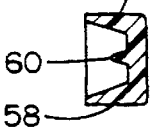
FIG. 9 illustrates an enlarged sectional view of an alternative embodiment of the cross-section taken along line 8—8 of FIG. 3.
Figure 7:
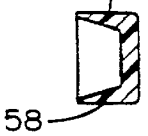
FIG. 7 illustrates a sectional view of an alternative embodiment of the cross-section taken along line 6—6 of FIG. 1.

Further reduction of material, weight and, therefore, cost can be provided by tapering said first and second lateral webs 26 and 28, substantially as shown in FIGS. 7 and 9 by first and second tapered lateral webs 56 and 58. Such tapering also allows for ease in parting the hanger from its mold cavity during the molding process while not significantly diminishing the strength of the hanger. In a preferred embodiment first and second lateral webs 26 and 28 are from about 0.75 mm to 1.25 mm in width at a point adjacent to said vertical wall 24 and tapered forwardly to a width of from about 0.25 mm to 0.75 mm. Most preferably, the first and second lateral webs are 1 mm in width at a point adjacent to said vertical wall 24 and tapered to a width 0.5 mm.

The upswept arms 16 and 18 of the present invention can be reinforced by a plurality of integral ribs 52, for example, which extend forwardly from the vertical wall 24 and tangentially from the first lateral web 26 to a point on the second (opposite) lateral web 28 at one or more of the positions as shown in FIGS. 1 and 3, of the drawings. When the body member 14 and upswept arms 16 and 18 are, as illustrated in FIG. 1, of a U-section configuration, which can include first and second webs 26 and 28 or first and second tapered webs 56 and 58, or, as illustrated in FIG. 3, an E-section configuration, which can further include center rib 50 or tapered center rib 60, it will be noted that the integral rib 52 is formed on only one side of the vertical wall 24. The integral rib 52 is about 0.25 mm to 0.75 mm in width and, preferably, about 0.50 mm in width. The integral rib 52 may extend forwardly from the vertical wall 24 the same distance as the first and second lateral web; preferably, no more than 5 mm and, most preferably, no more than 2.75 mm. In a particularly preferred embodiment with respect to a hanger having an E-section the thickness and width of the integral rib 52 and the center rib are the same. Similar to the center rib 60, the integral rib 52 can be tapered. The integral rib 52 adds further reinforcement to the hanger 10 from flexing due to the weight or compression force of the garment hanging therefrom.

Figure 4:
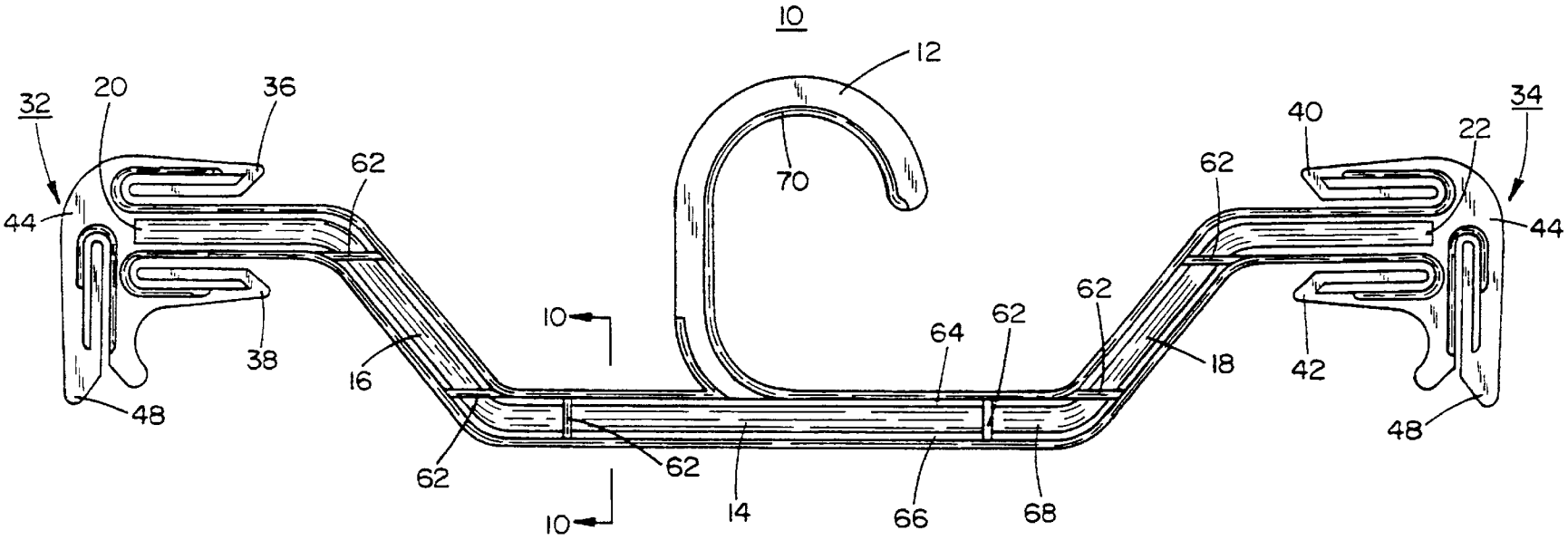
FIG. 4 illustrates a front elevational view of a lightweight, molded, one-piece plastic hanger pursuant to the inventive concept.
Figure 10:
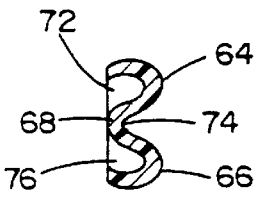
FIG. 10 illustrates an enlarged sectional view taken along line 10—10 of FIG. 4.
Figure 5:
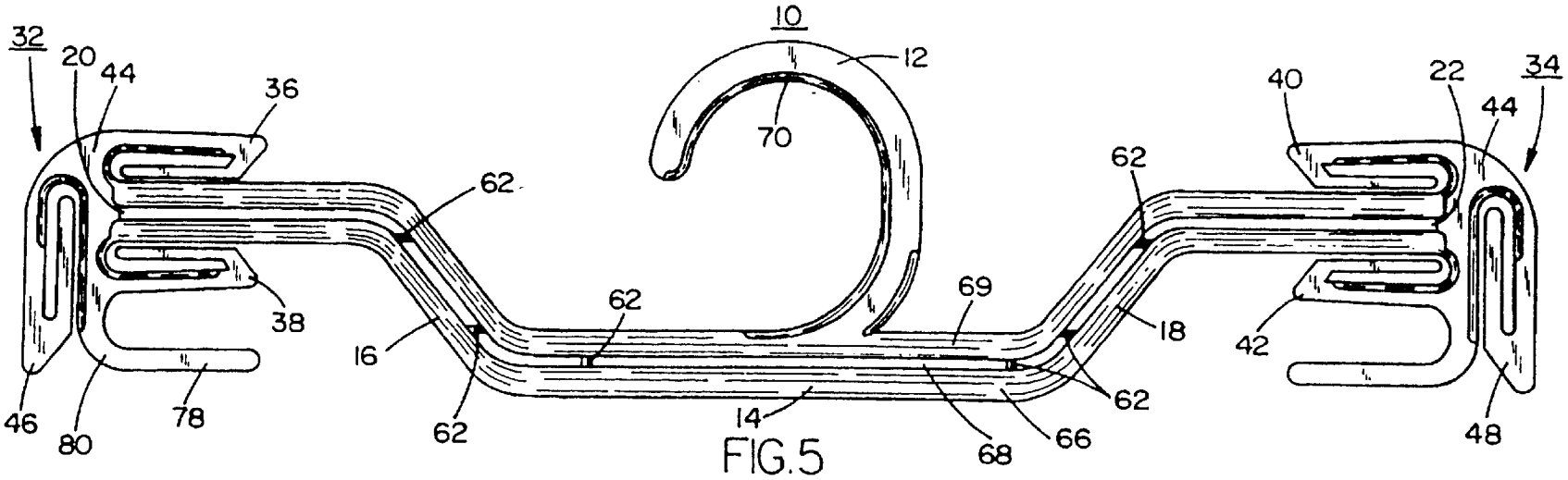
FIG. 5 illustrates a reverse view of FIG. 4, showing further modification thereof.
Figure 11:
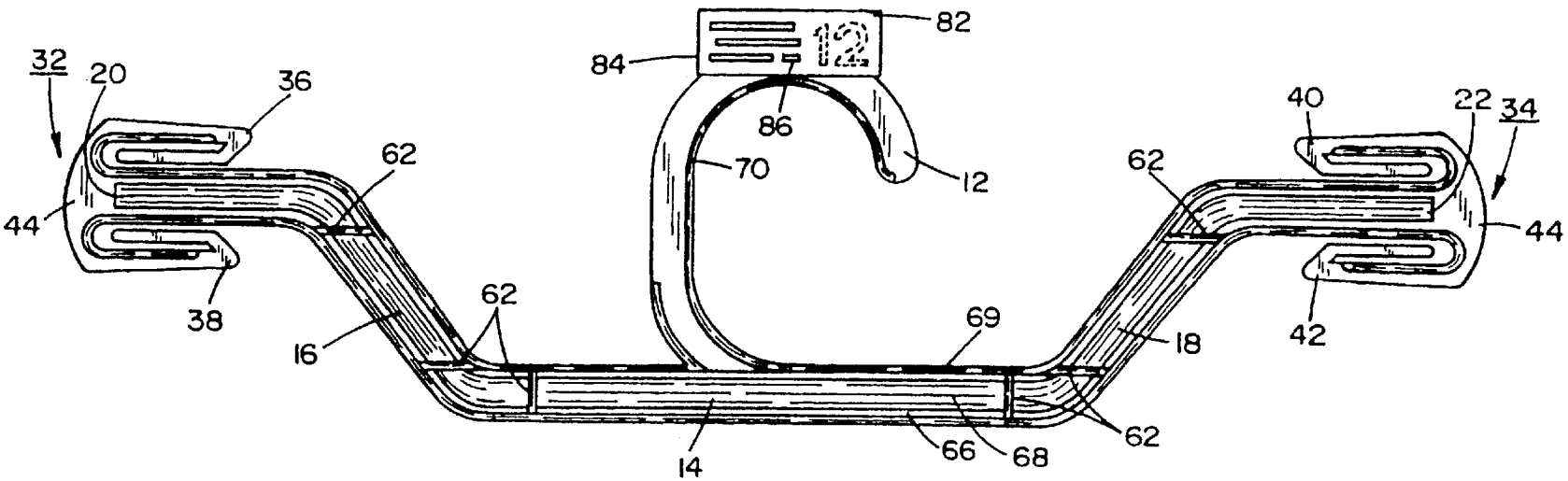
FIG. 11 illustrates still another embodiment of the present invention in a view similar to FIG. 4, showing modification thereof.

In another embodiment of the present invention, as illustrated in FIG. 4, where again like numerals refer to like parts of the hanger 10, the plastic garment hanger 10 has a central hook portion 12 which is integrally molded with the hanger body 14, the latter of which includes a pair of coplanar oppositely directed upswept arms 16 and 18 ending with a clip end portion 20 and 22 for suspending one or more garments, the body member 14 and upswept arms 16 and 18 being molded with a M-shaped cross-section ("M-section"). The M-section has a first curved web 64 and a second curved web 66 joined in midsection by a third curved web 68. The configuration of the M-section of the hanger illustrated in FIG. 4 is more readily observed by the enlarged cross-section view in FIG. 10. Similar to the U-section and E-section, the mass of a hanger having an M-section configuration is reduced in terms of thickness and weight thereby reducing material and shipping costs as well as producing a hanger having a greater strength to weight ratio as compared to other comparable hangers. FIG. 5 illustrates a reverse view of the hook member 12, body member 14 and upswept arms 16 and 18 of FIG. 4. It will be noted that a stabilizing bar 78 shown in FIG. 5 is not present in FIG. 4.

As illustrated in FIGS. 4 and 5, when the body member 14 and upswept arms 16 and 18 are of a M-section configuration, the upswept arms can be reinforced by a plurality of integral ribs 62 which extend into spaces 72, 74 and 76 (shown in FIG. 10) on both sides of the upswept arms 16 and 18 to form a solid cross-section (not shown). The integral rib 62 can be about 0.5 mm to 1.5 mm in width and, preferably, about 1.00 mm in width. The integral rib 62 adds further reinforcement to the hanger to from flexing due to the weight or compression force of the garment hanging therefrom.

It will be noted that the hook member 12 in FIG. 4 can be reinforced by flange 70 which can also extend from the reverse side of the hook member 12, as is illustrated in the reverse view in FIG. 5. Flange 70 provides additional reinforcement and stabilization to hanger 10.

FIG. 5 where again like numerals refer to like parts of the hanger, illustrates a molded plastic garment hanger of the present invention having a stabilizing bar 78 that extends longitudinally from an inner lower edge 80 of the reinforcing web 44 of the vertical clip 46 of each clip end portion. The stabilizing bar 78 can extend parallel to the body member of the hanger and, in a preferred embodiment, along the same plane as the body member 14.

Figure 14:
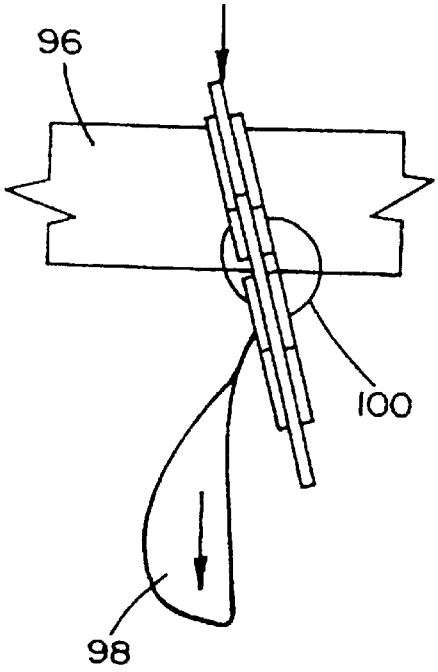
FIG. 14 illustrates a right end elevational view of the hanger shown in FIG. 4 suspended from a bar with a garment hanging therefrom.

FIG. 14 illustrates a right end elevational view of the hanger 10 shown in FIG. 4 suspended from a garment rack bar (or extension rod) 96 with a garment (brassiere 98) hanging therefrom. Typically, when a brassiere 98, such as a brassiere of a large size (i.e., 44DD), is suspended on a garment hanger 10, by resiliently engaging the strap 100 of the brassiere 98 in the clipping structure, the bulk of the garment lies below the hanger and the center of mass of the garment lies forward of the center of mass of the garment hanger. Thus, a light-weight hanger is caused to tilt forward, as is illustrated in FIG. 14, in which the center of mass of the hanger is indicated by a small arrow and the center of mass of the garment by a larger arrow.

Figure 15:
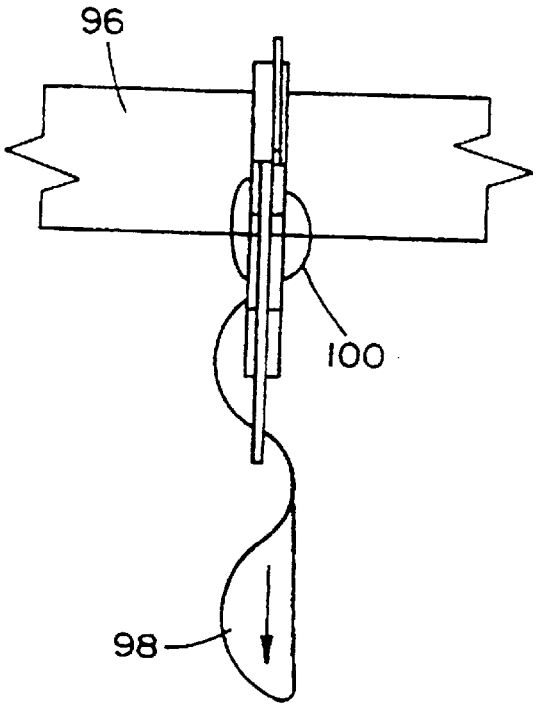
FIG. 15 illustrates a left end elevational view of the hanger shown in FIG. 5 suspended from a bar with a garment hanging therefrom.

FIG. 15 illustrates a left end elevational view of the hanger 10 shown in FIG. 5 suspended from a garment rack bar (or extension rod) 96 with a garment (brassiere 98) hanging therefrom. When the stabilizing bar 78 of the present invention is added to a garment hanger, as illustrated in FIG. 5, sliding the straps of the brassiere behind the stabilizing bar 78, as illustrated in FIG. 15, recenters the mass of the garment suspended therefrom below or equal with the center of mass of the bar and therefore the hanger itself. It will be noted that the stabilizing bar 78 illustrated in FIG. 5 may be present in the structure of a hanger of the present invention having an E-section or U-section as well as any other hanger in which the bulk of a garment suspended from the hanger lies to one side causing the hanger to tilt forward or backward.

FIG. 11, where again like numerals refer to like parts of the hanger 10, illustrates a front elevational view of a light-weight, molded plastic garment hanger of the present invention having an indexing cap for identifying at least one characteristic of the garment hanging therefrom. The hook member 12 defines at the upper portion thereof, a curve having a radius and center of curvature for at least a portion thereof. The hook member 12 is attached to the body member 14 that includes coplanar oppositely directed first and second upswept arms 16 and 18. Each of said upswept arms 16 and 18 extends upwardly and outwardly from the body member 14 and ends with a clip end portion 20 and 22. The clip end portions 20 and 22 position garment retaining clips longitudinally on either side of the hook member 12 at a height such that an axis drawn therebetween would intersect a circle defined around the center of curvature by the radius.

Figure 12:
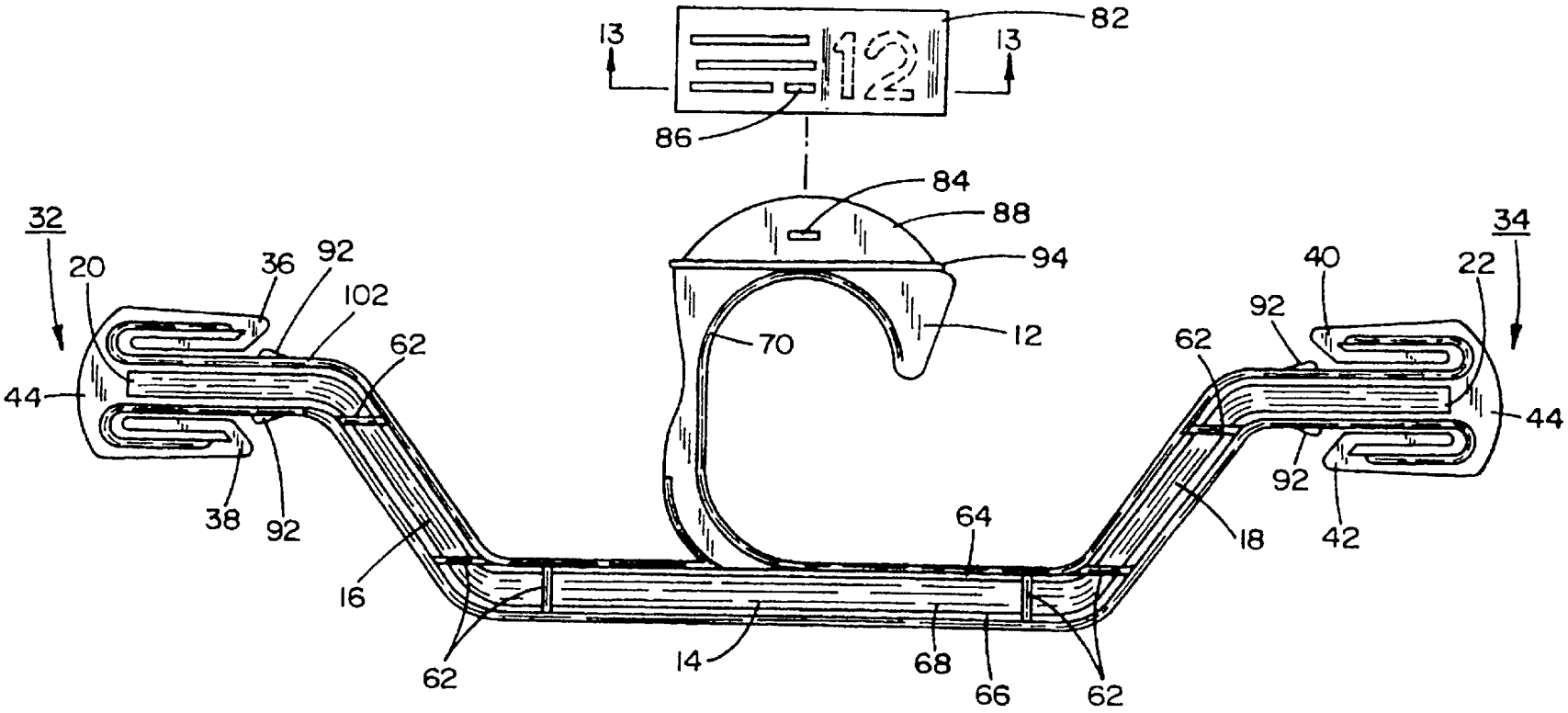
FIG. 12 illustrates yet another embodiment of the present invention in a view similar to FIG. 11, but with the hook removed from the index cap, showing further modifications.
Figure 13:
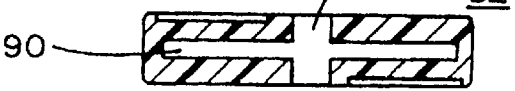
FIG. 13 illustrates an enlarged sectional view of the index cap taken along line 13—13 of FIG. 12.

As more specifically illustrated in FIG. 12, the hook member 12 has an upstanding flange 88 extending upwardly from the hook for receiving an indexing cap 82. The flange 88 extends above the top contour of the hook 12. The upstanding flange 88 can be molded perpendicularly to an arcuate flange 70 which defines the underside of the hook member 12. It will be noted that the modified embodiment shown in FIG. 12 primarily differs from the embodiment shown in FIG. 11 in the presence of ridge 94 upon which a bottom edge of the indexing cap 82 rests when the indexing cap 82 is attached to the hanger and the outer contour of the hook member 12.

A snap-fit engagement means 84 is defined on the upstanding flange 88. The indexing cap 82, which is generally planar, has a recess 90 formed therein for receiving the upstanding flange 88 therein. An aperture 86 is defined on the generally planar indexing cap 82. The aperture 86 is defined so as to engage the snap-fit engagement means 84 when the recess 90 of the indexing receives the flange 88 in order to attach the indexing cap 82 to the hanger 10. The recess 90 and aperture 86 are more readily apparent in the sectional view of the indexing cap 82 illustrated in FIG. 13. The indexing cap 82 has planar sides and one flat edge and, preferably, rounded top edges.

The indexing cap and snap fit engagement means are more specifically identified in copending U.S. Ser. No. 670,963 filed May 2, 1991 entitled AUTOMATED SYSTEM FOR SIZING HANGERS and U.S. Ser. No. 741,462 entitled INDICATORS FOR GARMENT HANGERS corresponding to PCT/AU90/00048 filed Feb. 8, 1990, the specifications of which are incorporated herein by reference.

The presence of one or more abutments 92 will be noted in FIG. 12. Abutment 92 is of a generally irregular triangular configuration and positioned on an outside edge 102 of the upswept arms 16 and 18 near the garment retaining clip. The abutment 92 is of a size that permits easy insert of a garment into the clip, such as a brassiere strap, but does not permit the garment to escape.

From the foregoing illustrations it is readily apparent that the present invention is directed to a lightweight molded plastic garment hanger for high volume injection molding. Through its configuration and cross-section, a hanger is produced that is lighter than comparable garment hangers without sacrificing strength and resistance to lateral deflection. Producing such a light-weight hanger lowers the overall cost of production (since less raw material is required), cost of shipping the hangers alone or the hangers with garments hanging therefrom and, further, is environmentally advantageous, particularly when hangers of this type are molded in hundreds of millions of units each year.

The inventive plastic hanger can be formed of styrene which provides a clear, virtually transparent hanger for maximum display of intimate apparel garments, such as bras and panties, to be suspended therefrom. In the alternative, the hanger can be molded from polypropylene; preferably, H.I. styrene polypropylene; polypropylene; polyvinylchloride; ABS or other suitable thermoplastics and mixtures thereof. For additional reinforcement, K resin can be added to the plastic material.

While there have been shown and described what are considered to be the preferred embodiments of the invention, it will, of course, be understood that various modifications and changes in form or detail can be readily made without departing from the spirit of the invention. It is therefore intended that the invention not be limited to the exact form and detail herein shown and described nor to anything less than the whole of the invention herein disclosed as hereinafter claimed.

What is claimed is:

1. A light-weight, one-piece, molded, plastic hanger, particularly adapted for high volume injection molding, said hanger comprising:

(a) a hook member, said hook member defining at [the] *an* upper portion thereof a curve having a radius and center of curvature for at least a portion thereof;

(b) a body member comprising first and second horizontally opposing extending inner arm portions with first and second parallel edges, said inner arm portions extending longitudinally from said hook member, said inner arm portions defining first and second ends at the ends remote from said hook member;

(c) first and second upswept outer arm portions with first and second parallel edges, said outer arm portions extending upwardly and outwardly from said first and second remote ends, with said first upswept outer arm [port] *portion* attached to the first remote end of said first inner arm portion and said second upswept outer arm portion attached to the second remote end of said second inner arm portion, each of said upswept outer arm portions ending with a horizontally extending arm attached to a clip end portion, wherein said upswept outer arm portions position a garment retaining clip longitudinally on either side of said hook member at a height such that an axis drawn therebetween would intersect a circle defined around said center of curvature by said radius.

2. The hanger according to claim 1, wherein each clip end portion comprises at least one horizontal clip having a reinforcing web which is a continuation of said upswept *outer* arm *portion*.

3. The hanger according to claim 1, wherein each clip end portion comprises at least one horizontal clip having a reinforcing web which is a continuation of said upswept *outer* arm *portion* and a vertical clip attached to [the] *a* vertical wall of said body member.

4. The hanger according to claim 3, wherein an axis drawn through the center of said vertical clip overlies the plane of said body member.

5. The hanger according to claim 2, which further comprises a stabilizing bar extending longitudinally and inwardly from each clip end portion, parallel to said body member.

6. The hanger according to claim 3, which further comprises a stabilizing bar extending longitudinally and inwardly from each clip end portion, parallel to said body member.

7. The hanger according to claim 1, wherein said plastic is polystyrene, polypropylene or polyethylene.

8. The hanger according to claim 1, wherein said upswept [arms] *outer arm portions* and body member further comprise one or more reinforcing means, said reinforcing means being an integrally molded rib integrally molded at one or more positions of said body member or said upswept [arms] *outer arm portions*.

9. A light-weight, molded, plastic garment hanger, particularly adapted for high volume injection molding, having an indexing cap for identifying at least one characteristic of a garment hanging therefrom, said garment hanger comprising:

(a) a hook member, said hook member defining at an upper portion thereof a curve having a radius and center of curvature for at least a portion thereof and said hook *member* having an upstanding flange extending from said hook *member* for receiving one of a plurality of different indexing caps, said flange projecting above the top contour of the hook *member*;

(b) a body member comprising first and second horizontally opposing extending inner arm portions with first and second parallel edges, said inner arm portions extending longitudinally from said hook member, said inner arm portions defining first and second ends at the ends remote from said hook member;

(c) first and second upswept outer arm portions with first and second parallel edges, said outer arm portions extending upwardly and outwardly from said first and second remote ends, with said first upswept outer arm portion attached to the first remote end of said first inner arm portion and said second upswept outer arm portion attached to the second remote end of said second inner arm portion, each of said upswept outer arm portions ending with a horizontally extending arm attached to a clip end portion wherein said upswept outer arm portions position [said] garment retaining clips longitudinally on either side of said hook member at a height such that an axis drawn therebetween would intersect a circle defined around said center of curvature by said radius;

(d) a snap-fit engagement means defined on said upstanding flange; and (e) a generally planar indexing cap having a recess formed therein for receiving said flange therewith, said indexing cap defining an opening which receives said snap-fit engagement means when said indexing cap is attached to said hanger.

10. The garment hanger as claimed in claim 9, wherein said upstanding flange is molded perpendicularly to an arcuate flange which defines the underside of said hook.

11. The garment hanger as claimed in claim 9, wherein said cap has planar sides and at least one flat edge.

12. The garment hanger as claimed in claim 11, wherein said cap has rounded top edges.

13. A garment display system comprising a plastic hanger which includes:

(a) a hook member, said hook member defining at an upper portion thereof a curve having a radius and center of curvature for at least a portion thereof;

(b) a body member comprising first and second horizontally opposing extending inner arm portions with first and second parallel edges, said inner arm portions extending longitudinally from said hook member, said inner arm portions defining first and second ends at the ends remote from said hook member;

(c) first and second upswept outer arm portions with first and second parallel edges, said outer arm portions extending upwardly and outwardly from said first and second remote ends to provide a high rack to display ratio, with said first upswept outer arm portion attached to the first remote end of said first inner arm portion and said second upswept outer arm portion attached to the second remote end of said second inner arm portion, each of said upswept outer arm portions ending with a horizontally extending arm attached to a clip end portion wherein said upswept outer arm portions position a garment retaining clip longitudinally on either side of said hook member at a height such that an axis drawn therebetween would intersect a circle defined around said center of curvature by said radius.

14. The garment display system of claim 13, wherein said body member and said inner and outer upswept arm portions are molded with a u-shaped cross-section, said u-shaped cross-section defining a vertical wall and a first and second lateral webs extending therefrom.

15. The garment display system of claim 14, wherein said body member and said inner and outer upswept arm portions are molded with said u-shaped cross-section having a center rib extending outwardly from said vertical wall between said lateral webs.

16. The garment display system of claim 13, wherein said body member and said inner and outer upswept arm portions are molded with a curved M-shaped cross-section, said curved M-shaped cross-section defining a first curved web and a second curved web joined in mid-section by a third curved web to form said curved M-shaped cross-section.

* * * * *